INVENTOR.
JAMES CHARLES PREBLE
ATTORNEY

United States Patent Office 3,329,897
Patented July 4, 1967

3,329,897
SWITCHING CONTROL APPARATUS FOR
TRANSCEIVER WITH LINEAR PHASED
ARRAY
James C. Preble, Seattle, Wash., assignor to Honeywell
Inc., Minneapolis, Minn., a corporation of Delaware
Filed Aug. 5, 1965, Ser. No. 477,507
2 Claims. (Cl. 325—21)

ABSTRACT OF THE DISCLOSURE

A transformer coupled bilateral phase shifting network is used to coupled a linear array of transducers to either a transmitter or receiver. In the transmit mode, phase quadrature signals are generated by the transmitter and applied to the phase shifter and linear array. In the receiver mode, signals from the array are transformed into a pair of phase quadrature signals by the phase shifter and applied to the receiver through a quadrature phase changing network conjugate to that used in the transmitter. The signal maybe transmitted and received at various angles from a reference.

The present invention pertains generally to signal transmission apparatus and more particularly to transmission of signals at various angles with respect to an antenna array. It is well known in the art that when using a linear array of antennas or transducers, that the change in the effective angle of the output signal can be changed by altering the phase of the signal applied to adjacent transducers. This is shown in various documents such as Air Force Manual No. 52–8 published by the Department of the Air Force June 30, 1951. This type of information is also shown in volume 26 of The Radiation Laboratory Series by McGraw-Hill, copyright 1948. However, these prior art units had certain deficiencies such as the presence of mechanically moving wave guides, etc., which are undesirable in today's technology and reliability standards. The present invention has resulted from an attempt to eliminate moving parts and also to provide a transducer which can both send and receive high power signals.

Briefly, the invention comprises the use of transformers to convert two input signals which are in quadrature phase with one another to a plurality of signals at predetermined phase angles. The signals are then combined with one another to produce signals of a variety of phases and all of a given amplitude. These signals are then applied to the array of transducers wherein adjacent transducers have a given phase difference such that the effect of the output signal direction with respect to the array can be varied depending upon the concentration of the various phase signals to the antenna. The energy being supplied to the transducer is then shut off and when a return signal is received by the transducer array, it is combined in a reverse fashion through the transformers to produce two quadrature phase signals at the input of the apparatus. One of these two signals is phase shifted to bring it in phase with the other signal and the resultant is applied to an indicator. Maximum amplitude of the return signal will be obtained when the phase angle of the signal applied between adjacent transducers is such that the direction of the beam is most nearly directed to the target.

It is therefore an object of this invention to provide improved apparatus for transmitting and receiving energy at variable angles with respect to an antenna array.

Further objects and advantages of this invention will be ascertained from a reading of the specification and appended claims in conjunction with the drawings wherein:

Figure 1:
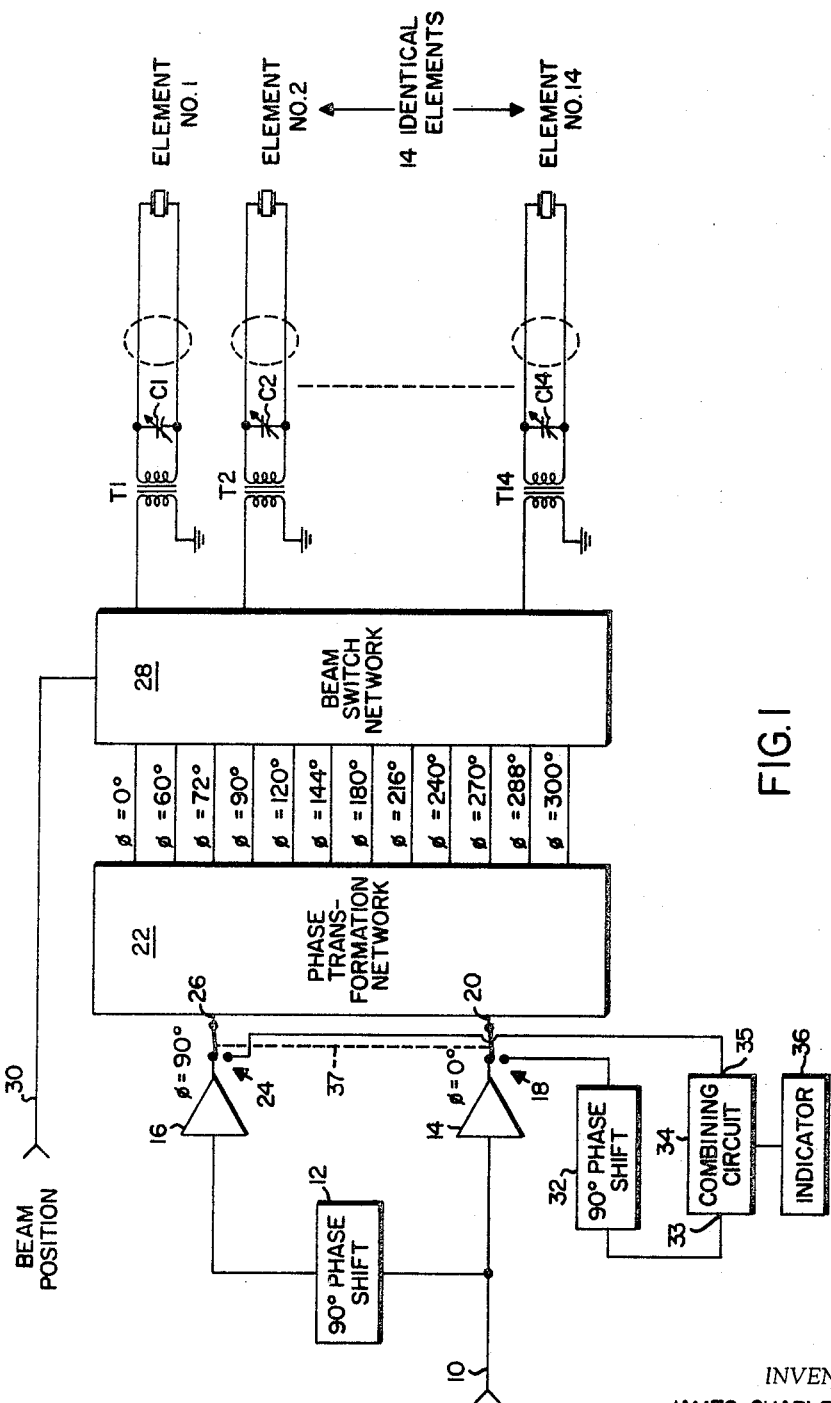
FIGURE 1 is a combination schematic and block diagram of the invention.

In FIGURE 1 an input 10 is shown connected to supply signal energy to a phase shifter 12 and an amplifier 14. The output of phase shifter 12 supplies 90° phase shifted energy to amplifier 16. The output of amplifier 14 is connected to one contact of a switch generally designated as 18. As shown the movable contact in switch 18 is contacting the output of amplifier 14 and the movable portion of this switch is connected to an input 20 of a phase transformation network 22. The output of amplifier 16 is connected to a stationary contact of a switch generally designated as 24. While switches 18 and 24 have been shown as mechanical it will be realized that they may be solid state such as diodes or transistors. A movable contact is shown contacting the output of amplifier 16 and this movable contact is connected to a second input 26 of phase transformation network 22. The phase transformation network has a plurality of output leads each connected to an input of the beam switch network 28. For one embodiment of the invention the phase of the various signals being applied to the beam switch network 28 from the phase transformation network 22 are 0°, 60°, 72°, 90°, 120°, 144°, 180°, 216°, 240°, 270°, 288°, and 300°. An input 30 is connected to the beam switch network. The input 30 is given the designation "beam position" and serves both to indicate the direction of the output signal and to perform or initiate a switching function within the beam switch network. Various outputs of the beam switch network 28 are connected to transformers which are further connected to transducers in an antenna array. Only three of the transformers have been shown for purposes of clarity and these transformers have been designated as T1, T2, and T14. There is one transformer connected to each of the transducer elements which have been shown as element 1, element 2, and element 14 with an indication that there are 11 elements not shown. Again, this is only one embodiment and many different variations of this invention will occur to those skilled in the art. One embodiment of this invention used a low frequency signal into input 10 and applied this signal to produce outputs which vary from an imaginary vertical with respect to the linear array of transducers. The exact angle depends upon the difference in phase angle applied to adjacent transducers. The various capacitors shown which are labelled C1, C2, and C14 are used to tune the circuit to exactly the frequency of the input signal.

The other stationary contact of switch 18 is connected to a 90° phase shifter 32 which has an output connected to an input 33 of a combining circuit 34. The second stationary contact of switch 24 is connected to an input 35 of combining circuit 34. An output of the combining circuit 34 is connected to an indicator 36. The two switches 18 and 24 are momentary contact switches which as shown are in the momentary contact position. The two switches are connected by a dashed line 37 which represents a mechanical interconnection so that both the switches are operated simultaneously. In the position shown, the switches are in a send position and normally they would be in the receive position where the movable contacts contact the stationary contact so that the transducers are connected to apply power to the indicator 36.

Figure 2:
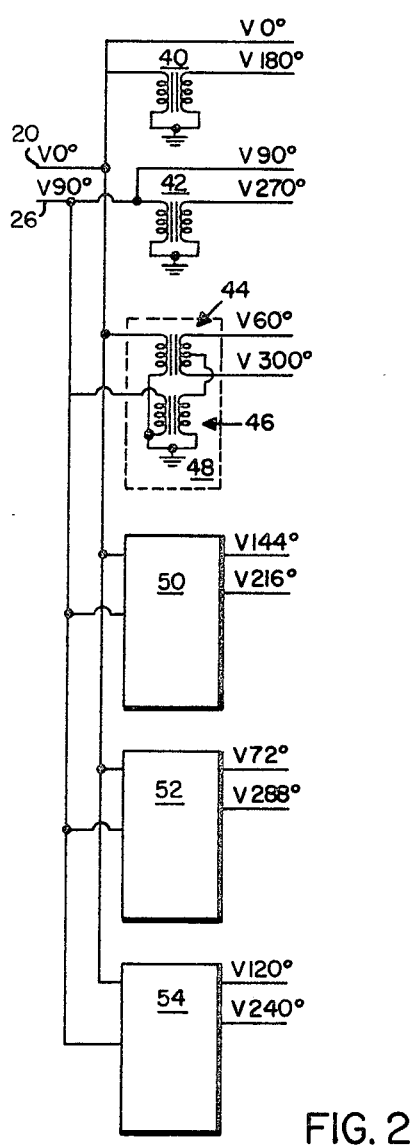
FIGURE 2 is a more complete disclosure of the apparatus contained in the phase transformation network portion of FIGURE 1.

As previously mentioned, the apparatus of FIGURE 2 constitutes in one embodiment the contents of block 22 in FIGURE 1. Two inputs 20 and 26 are shown which correspond with their counterparts in FIGURE 1. Input 20 is applied directly to the zero degree output and also to a transformer generally designated as 40 for obtaining 180° phase output. The input 26 is connected directly to an output and also to a transformer generally designated as 42 for obtaining 270° phase output signal. The two inputs are both applied to a pair of transformers generally designated as 44 and 46 and contained within a block generally designated as 48. As shown, transformer 44 has an input connected to the 0° input 20 and has a center tapped output. Transformer 46 has its input connected to the 90° input signal and has its output connected to the center tap of transformer 44. As shown, the two outputs of transformer 44 are at 60° and 300° with respect to the input signal on input 20. This is obtained by adjusting the transformation ratios of the transformers 44 and 46. If transformer 46 has an output of (0.500+JO) and the two outputs of transformer 44 are (0+JO.866) and (0−JO.866), the two outputs will be voltages with an amplitude of 1.0 at 60° and 1.0 at 300°. Three other blocks generally designated as 50, 52, and 54, contain generally the same apparatus as does the dashed block diagram 48. Block 50 provides outputs at angles of 144° and 216° while block 52 provides outputs of 72° and 288° and block 54 provides outputs of 120° and 240°. These outputs can be calculated and obtained in a fashion similar to that shown for block 48.

Figure 3:
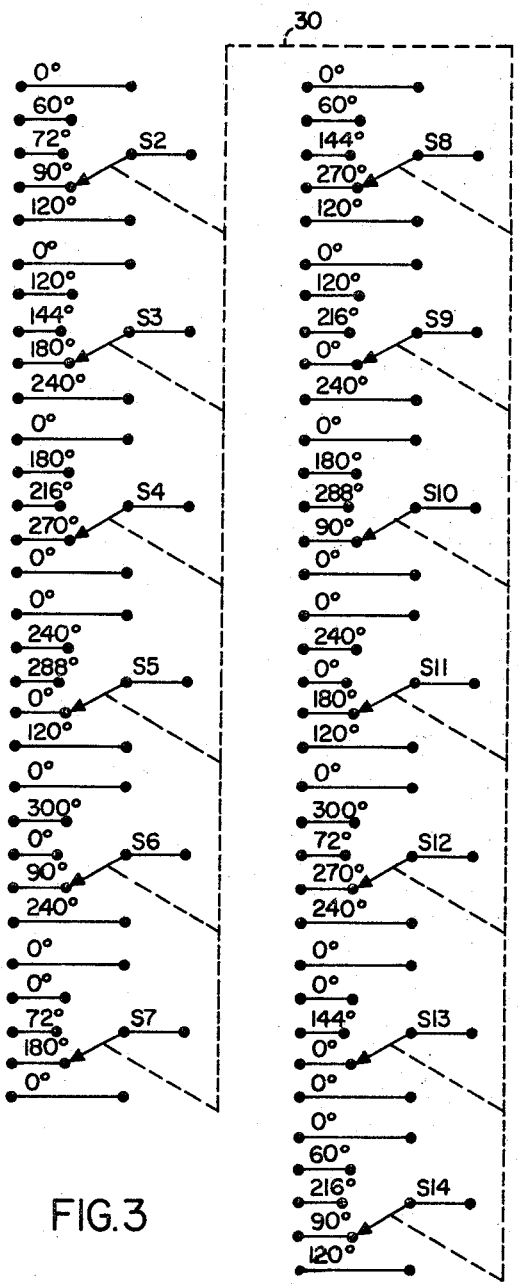
FIGURE 3 is a drawing showing one method of performing the beam switch network function of FIGURE 1.

FIGURE 3 shows a switch which has a dashed line contact element numbered 30 to correspond to the beam position input of FIGURE 1 to the beam switch network 28. The switch position indicator 30 is connected to the movable contacts of each of 13 switches numbered S2 through S14. There is no S1 switch as the transformer T1 is always connected to 0° phase signal. Each of the switches S2 through S14 is connected in FIGURE 1 to the transducers 2 through 14. Additionally, the switches are connected to the transformers in the phase transformation network such that in the first position all the transducers will receive the same phase signal. In the second position there will be a 60° phase difference between adjacent transducers. In the third position there will be a 72° phase difference while in the fourth and fifth positions there will be 90° and 120° phase difference between adjacent transducers respectively. Since it is obvious that the switching function can be performed by many other means than mechanical means and that other phase signals could be used, it is believed repetitious and time consuming to further amplify on the beam switch network. It will, however, be mentioned that this function could be performed by bilateral solid state means such as transistors if it is so desired.

In summarizing the operation of the circuit, an input signal to be transmitted is applied to input 10. This is phase shifted by phase shifter 12 and applied to the two amplifiers 14 and 16. The output of these two amplifiers 14 and 16 are 90° out-of-phase and are applied to the phase transformation network to obtain the previously mentioned phase signals all of a constant amplitude. The beam switch network has a calibrated beam position indicator 30 which designates what angle the resultant beam will take with respect to a vertical from the linear array of transducers. When the momentary contact switches 18 and 24 are placed in the condition shown in the drawing, a signal will be received by the transformers T1 through T14 and applied to the respective transducers. The output signal will be transmitted in approximately the direction indicated by the beam position indicator 30. The momentary contact switches are then released so that, when the transmitted signal is reflected back, it is received by the transducing elements and sent back through the beam switch network and into the phase transformation network. The signals are then combined in the various transformers in the phase transformation network to produce two output signals of 0° and 90° phase. As shown, the 0° phase signal is phase shifted 90° by phase shifter 32 to be of the same phase as the signal obtained from switch 24. The two signals are combined so that the amplitude of the combined received signals is indicated on indicator 36. The beam position is varied over the entire range and it will be known where the target is with respect to the transducer array by noting which beam position provides the greatest amplitude signal on the indicator 36.

Although only one embodiment has been described other embodiments will occur to those skilled in the art. The present embodiment utilized a 50 kc. signal and utilized a given number of elements and angles applied to these elements. As will be realized by those skilled in the art, many modifications can be made to the embodiment shown by changing the transmitting frequency, the angle of the phases, number of the elements, the method of combining the input signals to obtain these various phases through transformers. As previously mentioned, the various switches have been shown as mechanical switches. However, the switching function may be performed by semiconductors or any other suitable mechanism for performing the function of transmitting the signal in the desired path. While the system operation has been described using amplitude as the basis of combination of the return signal, it will be apparent to those skilled in the art that other characteristics could be used to provide the indication of the whereabouts or angle of the returning signal. It is therefore my belief that I should not be limited by the specification but only by the scope of the appended claims in which I claim:

1. apparatus of the class described comprising, in combination:
  signal supplying means for supplying a first signal to be transmitted and for supplying a second signal similar to said first signal but in phase quadrature therewith;
  transformer phase shifting means for providing equal amplitude output signals of 60°, 72°, 120° 144°, 180°, 216°, 240°, 270° 288° and 300° phase shift by transformer coupling input signals of zero and ninety degrees phase shift to output secondary windings having predetermined relationships to the input primary windings and combining the secondary winding outputs to obtain the aforementioned output signals of 60° 72°, 120°, 144°, 180°, 216°, 240°, 270°, 288°, and 300°, said phase shifting means operating bilaterally to produce quadrature components, of signals received at the secondary windings, at the input primary windings;
  a linear array of transducers;
  a beam switch network means connected between said transformer phase shifting means and said array of transducers, said beam switch network in a first condition connecting adjacent transducers of said array to receive signals of 60° difference in phase, in a second condition to receive signals of 72° difference in phase and in a third condition to receive signals of 90° difference in phase;
  receiving means for combining two out-of-phase input signals to provide an output indication indicative of the in-phase combination of the signals being received by said receiving means; and
  send-receive switch means connected to said signal supplying means, said transformer phase shifting means and said receiving means for supplying said first and second signals to be transmitted to said transformer means in a first condition and for supplying the resultant of return signals received by said transducers to said receiving means in a second condition.

2. Apparatus of the class described comprising, in combination:
  signal suplying means for supplying a first signal to be transmitted and for supplying a second signal similar to said first signal but in phase quadrature therewith;
  transformer phase shifting means for providing equal amplitude output signals of different predetermined phase relationships by transformer coupling input signals of zero and ninety degrees phase shift to output secondary windings having predetermined relationships to the input primary windings and combining the secondary windings to obtain the aforementioned predetermined phase relationships the phase shifting means operating bilaterally to segregate quadrature components from signals received at the secondary windings and provide the quadrature signals as outputs at the primary windings;

an array of transducers;

beam switching means connected between said transformer shifting means and said array of transducers, said beam switch network in a first condition connecting adjacent transducers of said array to receive signals of a first difference in phase, in a second condition to receive signals of a second difference in phase;

receiving means for combining two out-of-phase input signals to provide an output indication indicative of an in-phase combination of the signals being received by said receiving means; and send-receive switch means connected to said signal supplying means, said transformer phase shifting means and said receiving means for supplying said first and second signals to be transmitted to said transformer means in a first condition and for supplying the resultant of return signals received by said transducers to said receiving means in a second condition.

References Cited

UNITED STATES PATENTS

| | | | |
|---|---|---|---|
| 3,226,724 | 12/1965 | Brueckmann | 343—853 |
| 3,238,527 | 3/1966 | Vogt | 343—100 |
| 3,245,081 | 4/1966 | McFarland | 343—854 |
| 3,276,018 | 9/1966 | Butler | 343—100 |

JOHN W. CALDWELL, *Acting Primary Examiner.*

B. V. SAFOUREK, *Assistant Examiner.*